June 26, 1923.
C. R. BOULDIN
1,460,013
PLOW
Filed June 10, 1921
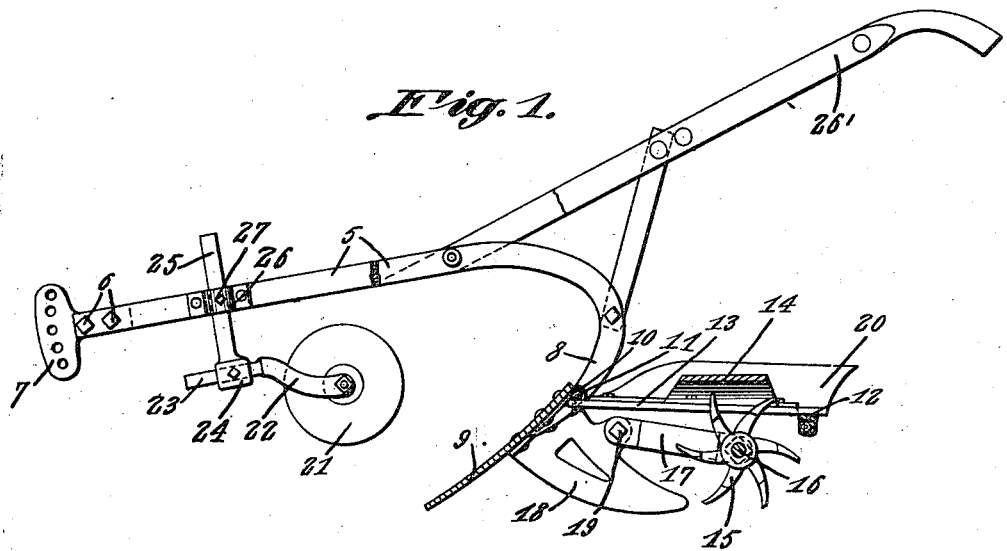
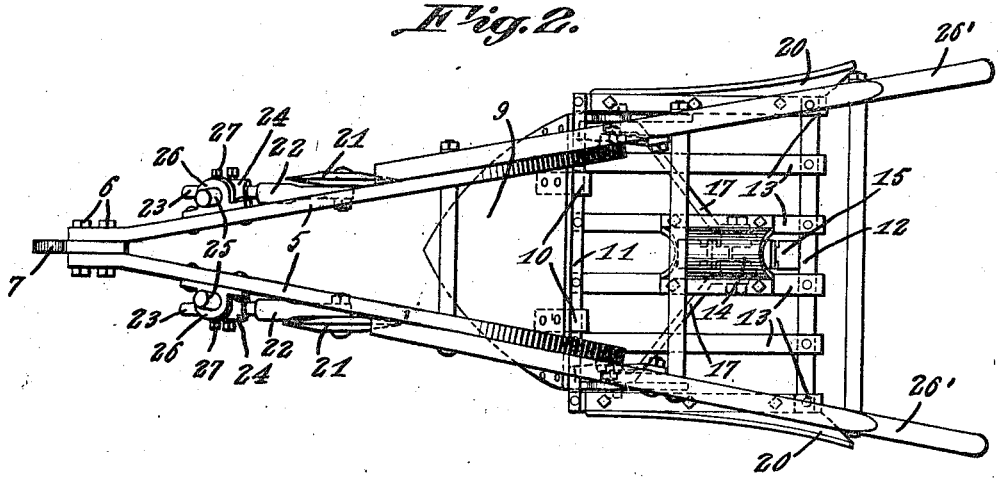
C. R. Bouldin, Inventor
By C. A. Snow & Co.
Attorney Patented June 26, 1923.

1,460,013

UNITED STATES PATENT OFFICE.

CLARENCE R. BOULDIN, OF McKENZIE, TENNESSEE.

PLOW.

Application filed June 10, 1921. Serial No. 476,552.

*To all whom it may concern:*

Be it known that I, CLARENCE R. BOULDIN, a citizen of the United States, residing at McKenzie, in the county of Carroll and State of Tennessee, have invented a new and useful Plow, of which the following is a specification.

The present invention has reference to agricultural machines, and more particularly to a harvesting machine especially designed for harvesting potatoes, beans, onions and the like agricultural products, the primary object of the invention being to provide a machine of this type which will remove the potatoes or the like being harvested, from the soil, and separate the earth and vines therefrom, at a single operation.

A further object of the invention is to provide means for agitating the screening member of the harvesting machine, whereby the earth and foreign matter may be freed from the vegetables as they pass to the rear of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is an elevational view partly broken away of a harvesting machine constructed in accordance with the present invention.

Figure 2 is a plan view of the same.

Referring to the drawing in detail, the frame or body portion of the machine includes diverging beams 5 which have their forward ends connected as by means of the bolts 6 passing through registering openings therein, the bolts 6 also providing means to secure the clevise 7 to the beams.

The beams 5 have their rear ends curved downwardly and forwardly as indicated at 8 where the same have connection with a relatively wide plow blade 9 of the shovel type, the width of the blade being such as to have its side edges extended beyond the side faces of the beams 5.

Secured to the upper edge of the plow blade 9 and disposed in spaced relation, are the straps 10 which are bent around the supporting rod 11 of the screening element, to provide a hinge or bearing for the screening element, the connection between the rod 11 and straps 10 being such as to permit of free vertical movement of the screening element with respect thereto.

This screening element also includes a rear bar 12 which has connection with the rod 11 as by means of the parallel space bars 13, the space between the bars being sufficiently large to allow dirt and other foreign matter to fall therethrough.

Supported intermediate the side bars of the screening element is a hood 14 which is in the form of a metal plate having flanges bolted to the central bars 13 of the screening element, and as shown this hood extends upwardly to guard the wheel 15 that operates thereunder. This wheel is mounted on the axle 16 that is carried by the pivoted arms 17, pivotally connected with the slides 18, as at 19, the slides 18 being however carried by the blade 9.

Forming a part of the screening element are the side boards 20 which are curved outwardly to guard the screening element to prevent the vegetables from falling laterally therefrom. Adjustable colters 21 are carried at the forward portion of the machine, each colter being supported by a bar 22 which is provided with a reduced portion 23 movable through an opening formed in the head 24 of the vertically adjustable rod 25. These rods 25 are held in the socket members 26 by means of the set screws 27 thereby securing the colters in predetermined positions of adjustment. From the foregoing it will be seen that these colters cut the grass and weeds prior to the digging operation, thus eliminating any possibility of the weeds and grass clogging the machine.

In order that the machine may be guided while in operation, handle bars 26' are provided and have connection with the plow beam adjacent to the rear ends thereof.

In the operation of the device, the machine is placed at one end of a row of potatoes or the like to be dug, whereupon the machine is moved along the row, the blade 9 of the machine removing the vegetables from the earth. The vegetables together with the earth and weeds which adhere thereto, pass upwardly over the upper edge of the plow, and onto the screening element, which is being constantly vibrated by contact of the toothed wheel 15 with the outer surface of the hood 14.

It will be seen that as the screening element is being vibrated, the earth and other foreign matter are dislodged from the vegetables and the vegetables are discharged at the rear of the screening element free of all foreign matter.

Having thus described the invention, what is claimed as new is:—

A harvesting plow comprising spaced beams having curved rear ends, a plow blade having connection with the curved rear ends of the beams, slides secured to the plow blade and extending rearwardly therefrom, a pivoted screening member comprising a plurality of spaced bars, a bar connecting the rear ends of the spaced bars, a hood supported by the screening member, pivoted arms carried by the slides, said pivoted arms extending inwardly and lying in proximity to each other, a wheel supported between the adjacent ends of the arms, said wheel adapted to contact with the hood to move the screening member vertically, and side boards carried by the screening member.

In testimony that I claim the foregoing as my own, I have hereto affixed my signature in the presence of two witnesses.

CLARENCE R. BOULDIN.

Witnesses:
   J. R. EZZELL,
   J. A. PARNELL.